United States Patent [19]

Kopp et al.

[11] Patent Number: 4,810,133

[45] Date of Patent: Mar. 7, 1989

[54] TENSION LEG PLATFORM TENDON INSTALLATION BY DEEP CATENARY TOW

[75] Inventors: Frans Kopp, Houston; Edward H. Phifer, Katy, both of Tex.

[73] Assignee: Shell Oil Company, Houston, Tex.

[21] Appl. No.: 103,222

[22] Filed: Sep. 30, 1987

[51] Int. Cl.$^4$ ............................................... F16L 1/04
[52] U.S. Cl. .................................... 405/168; 405/171; 405/195
[58] Field of Search ............... 405/158, 168, 169, 171, 405/195, 224

[56] References Cited

U.S. PATENT DOCUMENTS

| | | | |
|---|---|---|---|
| 3,640,080 | 2/1972 | Neal | 405/169 X |
| 4,354,446 | 10/1982 | Goldsmith et al. | 405/224 X |
| 4,377,354 | 3/1983 | Morton | 405/158 X |

Primary Examiner—David H. Corbin

[57] ABSTRACT

Tendon segments are fabricated on a laybarge, then temporarily stored on seabottom. When a tension leg platform is moored, two tow vessels pick up one end each of the finished tendon and tow it to deep water, with the tendon in a catenary shape. Upon arrival in deep water, one end of the tendon is released and allowed to free fall to its uprighted position. A special work boat then transfers the tendon to the tension leg platform for final installation.

9 Claims, 1 Drawing Sheet

TENSION LEG PLATFORM TENDON INSTALLATION BY DEEP CATENARY TOW

BACKGROUND OF THE INVENTION

Various options are available for tendon installation systems for deep water tension leg platforms. Water depth at the tension leg platform site is typically 2,000 feet or greater and tendons are heavy cumbersome structures which may be on the order of 24-inch outside diameter and 1.2-inch thick walls. Tendons may either be constructed vertically on-site which is an expensive and time consuming operation and which takes up valuable rig time, or tendons may be constructed off-site and towed in long sections which are, for example, 3,000 feet or longer. When tendons are towed in long sections there is the problem of sinking one end of the tendon once it arrives at the tension leg platform. This requires allowing flotation to release the tendon at the same time or in a certain sequence which is a complex and difficult operation. Accordingly, the present invention is directed to overcoming these problems in the art and providing a solution which is relatively inexpensive and requires less time in operation.

SUMMARY OF THE INVENTION

The primary purpose of the present invention is to provide a method for transporting and connecting a pipeline riser or tendon segment to an offshore platform or tension leg platform, which method is relatively simple and economical in use, and which does not subject the pipeline riser or tendon segment to dangerous stresses, and which makes the pipeline riser or tendon segment readily securable to the offshore platform or tension leg platform, with fluid connections where appropriate being easily made. Preferably, there is provided a method for transporting a pipe for installation on an offshore platform comprising, suspending the pipe in a catenary shape between two tow vessels; transporting the pipe with the two vessels, while maintaining the catenary shape of the pipe, to the offshore platform; and allowing one end of the pipe to free fall so that the pipe becomes upright, whereby the pipe is positioned for installation on the platform. More preferably, the present invention provides a method for assembling and transporting a tendon segment for installation on a tension leg platform, comprising, assembling the tendon segment offshore in relatively shallow water onboard a laybarge; temporarily abandoning the tendon segment on the seafloor and attaching marker buoys to both ends of the tendon segment which is on seabottom; retrieving the ends of the tendon segment by means of the marker buoys; suspending the tendon segment in a catenary shape between two tow vessels; transporting the tendon segment with the two tow vessels, while maintaining the catenary shape of the tendon segment, to the tension leg platform; and allowing one end of the tendon segment to free fall so that the tendon segment becomes upright, whereby the tendon segment is positioned for installation on a tension leg platform.

The present invention provides advantages over towing the tendon segment over the seafloor to the location of the tension leg segment, because dragging the pipe on the seafloor can be harmful to the pipe coating. The present invention also provides a method for pipe assembly by conventional horizontal welding methods on a laybarge and avoids hazards caused by having to tow the tendon segment across existing pipelines, if the pipes had been assembled ashore instead.

Other purposes, distinctions over the art, advantages and features of the invention will be apprent to one skilled in the art upon review of the following.

DESCRIPTION OF PREFERRED EMBODIMENTS

In accordance with the present invention tendon segments or pipes, for example 3,000 feet long, are fabricated on a laybarge moored in moderately shallow water, for example 750 feet. Tendon segments are, for example, 24-inch outside diameter, by 1.2-inch thickness. The finished tendon segment or pipe can be temporarily stored on the seabottom. When the platform is constructed or the tension leg platform arrives on site and is moored two tow vessels pick up one end each of a finished tendon segment or pipe and tow it to deep water, with the tendon segment or pipe in a catenary shape. Sufficient thrust is provided to maintain acceptable stress levels in the tendon segment or pipe wall. Upon arrival in deep water, one end of the tendon segment or pipe is released, for example by setting off a remote device which cuts the tow cable, and the tendon segment or pipe is allowed to free fall to its uprighted position. A special work boat then transports the tendon segment or pipe to the tension leg platform or other offshore platform for final installation.

Tendon segment or pipe free fall from a catenary configuration between two tow vessels is a feasible and simple alternative to free fall from the water surface and bending stresses during the free fall are not significantly different from those in the static catenary configuration.

The present invention overcomes a significant operational problem with the method of the prior art which requires instantaneous release of buoyancy. The present method avoids the need for such buoyancy. This method involves fabrication of the tendon segment or pipe on a laybarge or other support in moderate water depths (450 to 750 feet). The completed tendon segment or pipe is temporarily abandoned and later recovered by two tow vessels which transport the tendon segment or pipe in a catenary shape to deep water. Vessel thrust determines the catenary configuration and thus maximum curvature and bending stress. Upon arrival in deep water, one end of the tendon segment or pipe is simply released.

It was observed during tests and numerical analyses that model pipe maximum curvature did not significantly increase from the static maximum curvature. The free end did not seem to reach an equilibrium speed, but seemed to keep on accelerating until it reached a depth of about one half the water depth, after which it obtained briefly a constant speed before slowing down to vertical. The steeper the catenary is, the faster the tendon segment or pipe will fall because the drag force acts normal to the tendon segment or pipe axis.

Having thus generally described the method of the present invention, as well as its numerous advantages over the art, the following is a more detailed description thereof, given in accordance with specific reference to the drawings.

Figure 1:
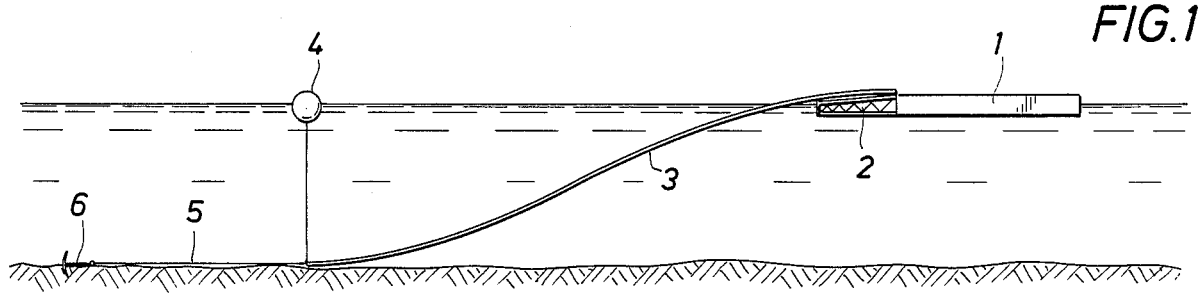
FIG. 1 discloses laying pipe with a conventional barge.

In FIG. 1, there is shown a laybarge 1 having a stinger 2 for laying a pipe or tendon segment 3 in relatively shallow water, for example 450–750 feet deep. The end of the pipe is attached to an initiation cable 5 which is connected to a pre-installed initiation anchor 6. In this manner, sufficient axial force can be applied to the pipe or tendon segment to limit bending stresses to acceptable values during pipe assembly. The end of the pipe or tendon segment 3 has a marker buoy 4 suspended therefrom which is used to show the location of the end of the pipe or tendon segment and for retrieval of the pipe or tendon segment subsequent to the end of construction.

Figure 2:
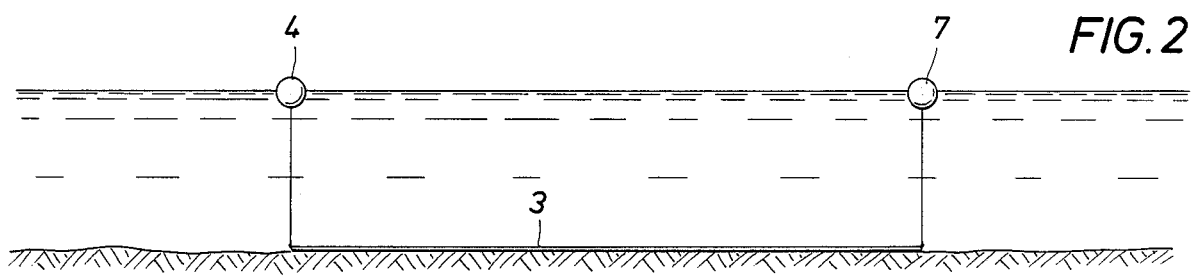
FIG. 2 discloses storing a tendon segment on seabottom.

In FIG. 2 there is shown the finished pipe or tendon segment on seabottom with marker buoy 4 at one end and marker buoy 7 at the other end. Thus, it is possible to assemble and store the pipe or tendon segment for an indefinite length of time or until the platform or tension leg platform is completed and ready for installation of the pipe or tendon segment.

Figure 3:
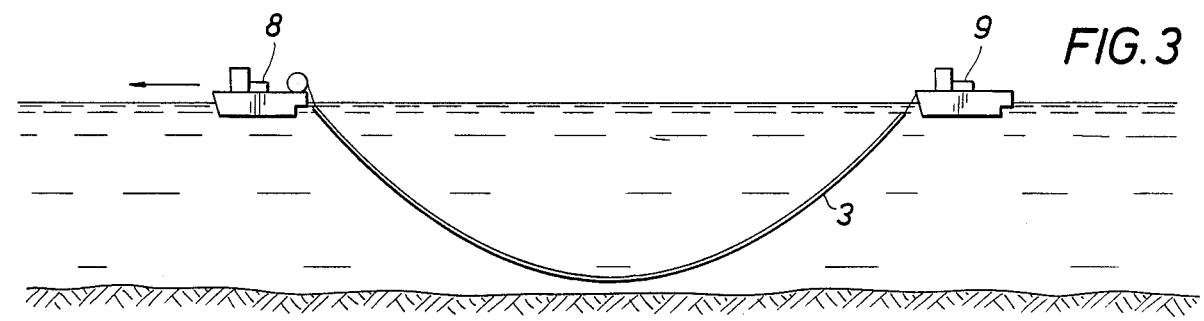
FIG. 3 depicts picking up the pipe in a steep catenary shape.
Figure 4:
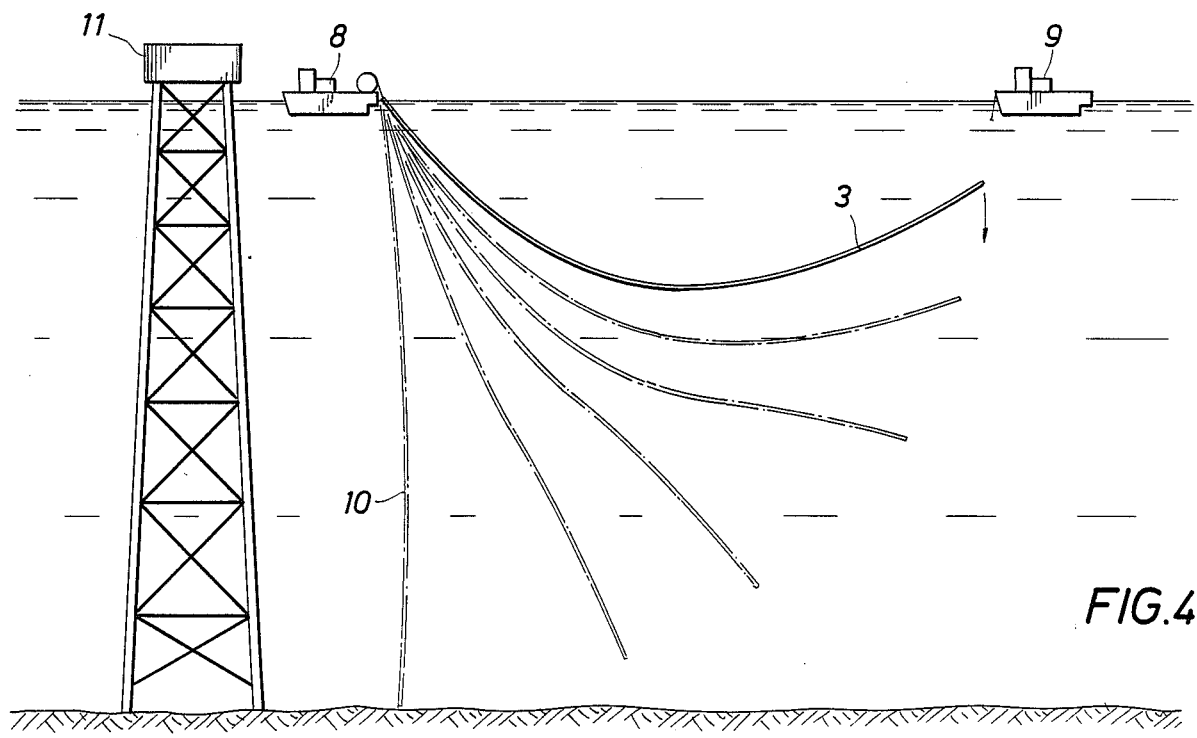
FIGS. 4 and 4a disclose free fall of the pipe in deep water.
Figure 4A:
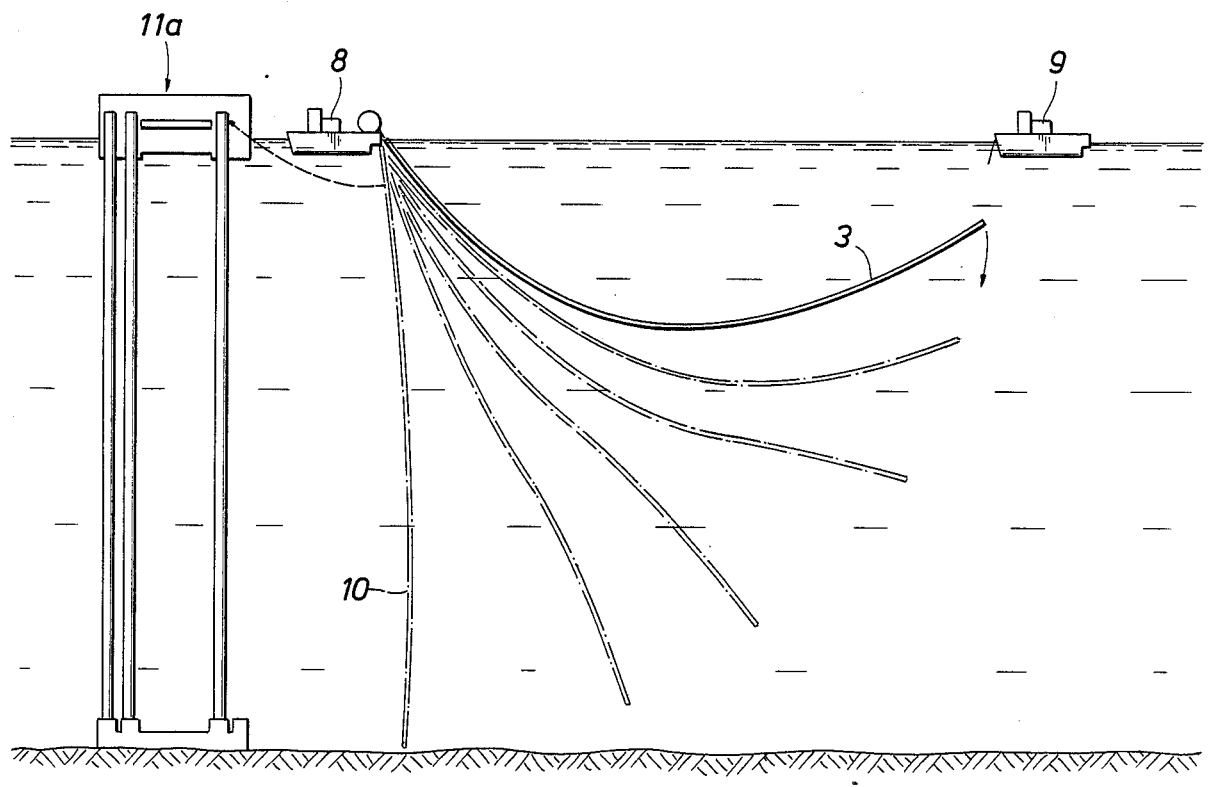

In FIG. 3 there is shown the use of two tow vessels 8 and 9. After the pipe or tendon segment 3 is stored on the seabottom for a selected length of time it is then retrieved by means of the marker buoys 4 and 7 using two tow vessels 8 and 9 as shown in FIG. 3. The backup tow vessel 9 maintains a backward pull on the tendon segment or pipe 3 and controls the shape of the catenary. After the vessels arrive at the site of the offshore platform or tension leg platform, FIGS. 4 and 4a, one of the vessels, usually the trailing vessel 9, releases one end of the pipe or tendon segment 3 so that the pipe then free falls as shown in phantom to reach a final vertical orientation as shown at 8. Thereafter, the pipe or tendon segment may be attached to the offshore platform or tension leg platform as shown at 11 and 11a.

The foregoing description of the invention is merely intended to be explanatory thereof, and various changes in the details of the described method may be made within the scope of the appended claims without departing from the spirit of the invention.

What is claimed is:

1. A method for transporting a pipe for installation on a offshore platform, comprising:
   suspending the pipe in a catenary shape between two tow vessels;
   transporting the pipe with the two vessels, while maintaining the catenary shape of the pipe, to the offshore platform; and
   allowing one end of the pipe to free fall so that the pipe becomes upright, whereby the pipe is positioned for installation on the platform.

2. The method of claim 1 wherein the pipe is a tendon segment and the offshore platform is a tension leg platform.

3. The method of claim 1 wherein the pipe is a pipeline riser.

4. The method of claim 1 including assembling the pipe offshore.

5. The method of claim 1 including assembling the pipe offshore in relatively shallow water onboard a vessel and attaching surface floats to both ends of the pipe which is temporarily stored on the seabottom.

6. The method of claim 5 including retrieving the ends of the pipe by means of the floats.

7. The method of claim 5 wherein several pipes are stored on seabottom.

8. A method for assembling and transporting a tendon segment for installation on a tension leg platform, comprising:
   assembling the tendon segment offshore in relatively shallow water on board a laybarge;
   attaching a surface float to at least one end of the tendon segment which is on seabottom;
   retrieving the seabottom end of the tendon segment by means of the float;
   suspending the tendon segment in a catenary shape between two tow vessels;
   transporting the tendon segment with the two tow vessels, while maintaining the catenary shape of the tendon segment, to the tension leg platform; and
   allowing one end of the tendon segment to free fall so that the tendon segment becomes upright, whereby the tendon segment is positioned for installation on the tension leg platform.

9. The method of claim 8 including attaching a surface float to the other end of the tendon segment and temporarily storing the tendon segment on seabottom.

* * * * *